UNITED STATES PATENT OFFICE.

JOHANNES HUGO GUSTAV WALKHOFF, OF HAMBURG, GERMANY.

CANNED FISH AND METHOD OF CANNING.

SPECIFICATION forming part of Letters Patent No. 325,997, dated September 8, 1885.

Application filed January 23, 1882. (No specimens.)

*To all whom it may concern:*

Be it known that I, JOHANNES HUGO GUSTAV WALKHOFF, a subject of the Emperor of Germany, and residing in Hamburg, German Empire, have invented new and useful Improvements in the Preservation of Fish, of which the following is a specification.

Heretofore fish have been preserved by smoking, salting, or drying them, by pickling them in vinegar, by treating them with saltpeter, borate of soda, salicylic acid, or sulphate of alumina, by impregnating them with carbonic oxide, by putting them into tallow, oil, &c.; but these methods have the disadvantage of almost entirely changing the flavor of the fish, or of imparting to it a peculiar strong taste, or of not allowing the fish to be kept in a good state for a length of time.

The object of the present invention is to preserve fish for a considerable period without appreciably detracting from its original flavor; and for this purpose I employ a method in which certain means otherwise individually used with the same intent are combined in a novel manner, whereby an improved article or product is produced.

For carrying my invention into effect, the fish, soon after having been caught and killed, are put into strong brine or packed into barrels together with dry salt. After they have become sufficiently impregnated with the salt their entrails are taken out. This may be done by laying hold of the pectoral fins near their base and tearing them away with a slight twist, as this manipulation will cause the intestines to follow, so that they can then easily be drawn out also. The fish are thereupon exposed for two or three days to a drying process, which is carried out, according to the state of the weather, either in the open air or in suitable chambers, and thereafter they are smoked over a low fire of wood, which may partly be kept up with sawdust or tanning-bark, until they have attained a bright-yellow color with a golden tinge; but care must be taken not to roast them. The fish are then packed, by preference with their backs downward, into tin boxes or other vessels, whereupon sweet-oil—*i. e.*, any eatable oil—is poured over them, so that it fills the boxes or vessels to the brim. Spices—such as cloves, laurel-leaves, and others—or aromatic fruits—as, for instance, tomatoes and paradise-apples—may besides be added, if desired. The boxes or vessels, having been hermetically closed by soldering, or in other known manner, are finally exposed for some time, according to the method of Appert, to a moderate heat, by preference in a water bath, for the purpose of killing all fermentable germs, and, besides, of causing the oil and the taste of the spices to better penetrate into the flesh of the fish.

When fish are treated according to this invention their natural taste is but very little altered, they may be skinned with facility, and they keep unaltered for a number of years, and the product is an improved article of preserved fish having such flavor and color as herein set forth.

I claim as my invention—

1. The process of preserving fish hereinbefore described, which consists of first salting the fish, eviscerating and drying them, then smoking the fish until they acquire a yellow color with a golden tinge, and finally packing them with sweet-oil into suitable vessels, hermetically closing the same, and exposing them and their contents to a moderate heat, substantially as and for the purpose set forth.

2. The above-described product, which consists of eviscerated canned fish impregnated with salt, the volatile products of combustion, and oil, by which their natural flavor is modified and improved upon, and the fish rendered preservable for long periods, substantially as set forth.

In testimony whereof I have signed my name to this specification in the presence of two subscribing witnesses.

JOHANNES HUGO GUSTAV WALKHOFF.

Witnesses:
PAUL MÖLLER,
CHAS. R. HOYT.